(12) United States Patent
Nögel (10) Patent No.: US 12,369,567 B2
(45) Date of Patent: Jul. 29, 2025

(54) LEASH DEVICE HAVING A RETRACTION MECHANISM

(71) Applicant: Claudia Nögel, Lingen (DE)

(72) Inventor: Claudia Nögel, Lingen (DE)

(73) Assignee: Claudia Nögel, Lingen (DE)

( * ) Notice: Subject to any disclaimer, the term of this patent is extended or adjusted under 35 U.S.C. 154(b) by 0 days.

(21) Appl. No.: 18/684,063

(22) PCT Filed: Aug. 9, 2022

(86) PCT No.: PCT/EP2022/072384
§ 371 (c)(1),
(2) Date: Feb. 15, 2024

(87) PCT Pub. No.: WO2023/020900
PCT Pub. Date: Feb. 23, 2023

(65) Prior Publication Data
US 2024/0358000 A1  Oct. 31, 2024

(30) Foreign Application Priority Data

Aug. 20, 2021 (DE) ..................... 10 2021 121 692.3

(51) Int. Cl.
*A01K 27/00* (2006.01)
(52) U.S. Cl.
CPC ................. *A01K 27/004* (2013.01)

(58) Field of Classification Search
CPC .................................................... A01K 27/004
See application file for complete search history.

(56) References Cited

U.S. PATENT DOCUMENTS

| 2011/0120389 | A1 | 5/2011 | Yackley | |
| 2014/0060456 | A1* | 3/2014 | O'Brien | A01K 27/004 |
| | | | | 119/796 |

FOREIGN PATENT DOCUMENTS

| DE | 102019207348 B3 * | 7/2020 |
| EP | 3 398 432 B1 | 7/2020 |
| WO | 2012149625 A1 | 11/2012 |

* cited by examiner

*Primary Examiner* — Kimberly S Berona
*Assistant Examiner* — Nevena Aleksic
(74) *Attorney, Agent, or Firm* — Colson Law Group, PLLC (57) ABSTRACT

The invention relates to a leash device for animals, in particular for dogs, comprising: a housing which is designed to be held by a person; a retraction mechanism which is arranged inside the housing; a leash which is designed to be connected by one end to an animal and by the other end, via a coupling mechanism, to the retraction mechanism of the leash device; wherein the retraction mechanism is designed to retract the leash into the housing from an at least partially extended state; and wherein the coupling mechanism is designed to uncouple the leash from the retraction mechanism when the leash is completely extended.

9 Claims, 5 Drawing Sheets

LEASH DEVICE HAVING A RETRACTION MECHANISM

TECHNICAL FIELD

The invention relates to a leash device for animals in general and dogs in particular, for use when walking the animal.

BACKGROUND

In particular, dog owners require dog leashes for taking out their dogs in order to control them even in unpredictable events and to meet legal requirements. The dog leash is held at one end by the dog owner, wherein the other end is connected to the dog via a collar or what is known as a dog harness. There are a plurality of different variants of leashes, which differ, for example, in their length and use.

In addition to short leashes such as handler or retriever leashes, drag leashes, in particular, are very popular. These are simple nylon strips or ropes which exist in different colors and lengths and often have a loop so that they can be held well by the dog handler.

The drag leash is frequently used in particular for training and thereby serves to specify a certain radius for the dog and to prevent the dog from possibly chasing things or similar situations. In addition, a drag leash is easier to grasp than the dog itself if the dog runs away. In addition, the dog feels the resistance of the leash sliding on the ground and thus always assumes constant contact with the dog owner and tends to follow its owner for this reason alone.

However, a disadvantage of drag leashes is that they can quickly become hooked in regions with denser underbrush or branches, for example in the woods, and thus can stop the dog abruptly, in particular when it is running. In addition, the usually longer leash is often impractical if the dog owner has the leash in their hand and the dog runs close to and around the dog owner, and the long leash becomes tangled in the dog or the owner's legs as a result. In order to prevent this, the owner must always manually arrange the leash and then must keep a large part of the leash in their hand. This is disadvantageous in particular if the dog constantly changes its distance from the owner. In addition, manually arranging the leash has the additional disadvantage that it takes a relatively long time and thus there is a risk of pedestrians or cyclists being disrupted, for example.

For this reason, there are leashes known as retractable leashes, in particular for normal walking or dog walks when the dog is not necessarily being trained. These retract within a housing, which is usually held in the dog owner's hand, changing the length of the leash. When the dog moves further away from the dog owner, the leash extends out of the housing, and when the dog approaches the owner, the leash retracts.

The retraction process is usually caused by a retraction mechanism consisting of a reel and a torsion spring. A torque for retracting the leash is applied to the reel by the torsion spring. If the leash is not under load, for example from the dog pulling on it, the leash is retracted onto the reel. Frequently, the reel can be manually locked by the dog owner so that the dog cannot move farther from the owner.

Retractable leashes are considered to be very practical, user-friendly and dog-friendly for everyday life, but also have disadvantages. These are in particular that it is not possible to use them like drag leash, meaning in particular for training purposes. However, there are leash connection pieces that can be attached as an extension of the leash between the collar and the retractable leash. However, these cannot also be retracted into the housing of the retractable leash and represent an additional item to be purchased and transported. By means of a simple connection, for example a snap closure as is known from abdominal belts in backpacks, or special forms of carabiners, the dog can be disconnected from the leash or from the leash connection piece or connected to the leash again. However, different leash functions cannot be combined as a result.

In spite of this, it is, however, necessary or at least advisable to use a drag leash particularly when training young dogs but also in certain situations, which is why dog owners purchase both leash types and must often take along both leash types when walking the dog and use them differently depending on the area.

It is therefore an object of the present invention to provide a dog leash that eliminates the above-mentioned disadvantages and can be used as versatilely as possible.

SUMMARY

The leash device according to the invention for dogs has a housing which is configured to be held by a person. In addition, the leash device has a retraction mechanism arranged within the housing and a leash which is designed to be connected at one end to a dog and at the other end, via a coupling mechanism, to the retraction mechanism of the leash device. According to the invention, the retraction mechanism is designed to retract the leash into the housing from an at least partially extended state. The leash can also be unrolled from the retraction mechanism when a longer unrolled leash is required. The coupling mechanism is designed such that it can uncouple the leash in the completely extended state from the retraction mechanism, wherein the coupling mechanism is arranged translationally moveably within the retraction mechanism. An uncoupled leash is completely disconnected from the retraction mechanism and is no longer connected thereto in any way whatsoever. However, an uncoupled leash can again be coupled to the retraction mechanism and subsequently be retracted again into the housing by the retraction mechanism. In the completely unrolled state, the connection between the leash and the retraction mechanism can always be disconnected or established as required, or in other words the extended leash can be coupled to and uncoupled from the retraction mechanism as desired by means of the coupling mechanism.

Using the leash device according to the invention, both the advantages of a retractable leash and those of a drag leash can be utilized in the specific environmental situations. In a state in which the leash is connected to the retraction mechanism and thus also to the housing, it is possible to ensure that the leash is only ever unrolled to, and thus only as long as, the distance of the dog from the owner requires and the leash does not become tangled between the legs of the owner or the dog or in vegetation or the like.

Furthermore, by means of the leash device according to the invention, it is possible when the leash is decoupled to establish a drag leash function, whereby all advantages of this leash type can also be achieved.

Of course, the product can also be applied to animals other than dogs without departing from the concept of the invention.

In an advantageous embodiment of the invention, the retraction mechanism is designed to exert a continuous force on the leash so that it retracts in the housing. The force is thereby preferably caused by an elastic element such as a torsion spring. Alternatively or additionally, the retraction mechanism is designed such that it is locked in a state in which the leash is uncoupled from the retraction mechanism and is active in a state in which the leash is connected to the retraction mechanism. In this context, "active" means that the retraction mechanism can be actuated or is automatically actuated so that the coupled leash is retracted in the housing. In contrast, "locked" means that the retraction mechanism is not active and cannot be rotated or set in rotation.

In an advantageous embodiment of the invention, the retraction mechanism makes it possible to lock the retraction mechanism even when it is connected to the leash and is not yet fully extended. In this way, further extension of the leash can be prevented in order to limit the unrolled leash length and to restrict the movement radius of the dog. This locking function can be used by the dog owner as required.

In a further advantageous embodiment of the invention, the retraction mechanism has a reel on which the leash is retracted. A reel offers a practical possibility for being able to retract and unroll the leash in an orderly and neat manner.

In a further advantageous embodiment of the invention, the coupling mechanism is formed by a coupling element on the leash and a coupling counterpart on the retraction mechanism. This embodiment is particularly advantageous if the coupling element and the coupling counterpart form a positive-locking connection. Due to the positive-locking connection, both secure force transmission from the retraction mechanism to the leash can be ensured, and uncomplicated uncoupling of the leash from the retraction mechanism can also be ensured.

In an advantageous embodiment of the invention, the leash has a round cross section perpendicular to the extension direction at the end at which it is connected to the retraction mechanism. The round cross section can be provided, for example, by a rope. Due to the round cross-sectional shape, the leash can be inserted more simply than other cross sections into a recess or groove provided for this purpose, these being required in certain embodiments for the coupling mechanism. Such a cross-sectional shape thus simplifies the design effort of a coupling mechanism and thereby simplifies the process of coupling the leash to the retraction mechanism.

According to the invention, the coupling mechanism is arranged within the retraction mechanism and is thus integrated therein. Further, the coupling mechanism is arranged so as to be translationally movable. A compact design can be realized by a coupling mechanism arranged in the retraction mechanism. If the coupling mechanism is moveably arranged, a clear position for the not completely unrolled state and a position for the unrolled state of the leash can be defined and thus secure uncoupling and coupling can be ensured. It enables a design in which uncoupling is made possible only when the leash is completely unrolled and thus contributes to functional reliability. A coupling mechanism that can be moved in a translational manner can, for example, be connected via a slider, wherein the slider can be moved only when the leash is completely unrolled into an uncoupling position in which the leash can be removed from the retraction mechanism. The translational movement of the coupling mechanism can automatically be ensured in the case of a completely unwound leash by correspondingly provided spring elements or the like, or can be performed by manual actuation.

The embodiment comprising a moveably integrated coupling mechanism is further advantageous when it has an elastic element, such as a spring, which applies a continuous force to the coupling mechanism so that this is held in a defined position. This enables an embodiment of a leash device according to the invention in which the coupling mechanism is held by the elastic element in a position in which uncoupling of the leash and the retraction mechanism is not possible. In such an embodiment, uncoupling can only take place when the coupling mechanism has been moved against the force of the elastic element. This contributes significantly to the functional reliability of the device.

In an advantageous embodiment of the invention, the housing has a housing door, in particular with a latching element, wherein the housing door is designed to be pushed along the housing, in particular against a restoring force, preferably of a spring, and through which the coupling mechanism can be moved in a translational manner at least so far out of the housing that the coupling counterpart projects out of the housing. The advantageous latching element is designed to latch in a corresponding recess in a preferably immovable part of the leash device, in particular the housing, and thus to at least transitionally fix the position of the housing door in an open position.

In an advantageous embodiment of the invention, the coupling element has a taper and/or a bevel, which is designed such that it interacts with the housing door in such a way that, during the translational movement of the coupling mechanism, the latching element of the housing door is guided out of the recess and in particular the housing door is guided in such a way that it latches into a latching recess in the coupling mechanism upon further movement of the coupling mechanism. In this way, it is possible to ensure that the housing door is brought into a position provided for uncoupling the leash by the translational movement of the coupling mechanism. In this position, the housing door prevents an unintentional translational movement of the coupling mechanism back into the housing.

Preferably, the coupling mechanism has a latching recess which is designed in such a way that part of the housing door latches in this latching recess in a state of the coupling mechanism in which the coupling mechanism is moved at least partially out of the housing in a translational manner. It can thus be ensured that, in a state in which the coupling mechanism is at least partially located outside the housing, the housing door cannot close and the coupling mechanism can only be moved into the housing by actuating the housing door. In this way, it is thus possible to ensure that the coupling mechanism cannot be unintentionally moved into the housing in a translational manner.

In a further advantageous embodiment of the invention, the coupling mechanism has a translation lock, which is configured to block the translational movement of the coupling mechanism when the coupling element is disconnected from the coupling counterpart. In this way, the coupling mechanism can be prevented from being moved into the housing in a state in which the coupling element is disconnected from the coupling counterpart. The translation lock is preferably designed as a leaf spring which is pretensioned and designed such that, in a state in which the coupling element is not connected to the coupling counterpart, it interacts with the housing in such a way that movement of the coupling mechanism is blocked and is removed from the housing by connecting the coupling element to the coupling counterpart, and the blocking effect is thus overridden.

Preferably, this embodiment comprising a translation lock is combined with an embodiment comprising a latching recess in the coupling mechanism. In this way, the translational movement of the coupling mechanism can be doubly secured and this movement is prevented from taking place unintentionally.

In a further advantageous embodiment of the invention comprising a reel, the coupling mechanism is designed in the form of a fold-out bracket on the circumference of the reel in such a way that it is recessed in the circumference of the reel in the folded-in state. For uncoupling, the bracket can then be released from the reel so that there is no longer a connection between the retraction mechanism and the leash. The embodiment has, on the one hand, the advantage that, due to the bracket fitting in the reel, a round shape is created which ensures that the leash can be retracted on the reel by the retraction mechanism in a problem-free manner. On the other hand, in the uncoupled state, the bracket serves as a handle for the dog owner, who can thus also easily hold the loose leash if necessary. The bracket can, for example, be connected to the retraction mechanism in a positive-locking manner via a snap connection.

In an alternative embodiment comprising a reel, the housing has a first coupling opening, which is designed such that the end of the rope, which is connected to the coupling mechanism, can be guided through the recess and can be connected to or released from the unrolling mechanism.

This embodiment is furthermore advantageous if a securing element, such as a securing disk, is additionally provided between the reel and the housing, wherein the securing element can be moved on the reel and thus can assume different positions. The securing element has a second coupling opening, which corresponds to the shape of the first coupling opening located in the housing. The securing element can be brought into a position in which the two coupling openings are brought into alignment and the leash can be guided through the coupling openings accordingly. If the securing disk is in another position, the leash cannot be guided out of the housing and is thus secured against uncoupling.

In an advantageous embodiment of the invention, the leash device has a detent mechanism, which is designed to lock the leash in a state coupled to the retraction mechanism and to secure it against unintentional uncoupling. The detent mechanism of the leash can be ensured, for example, by a ball having a circumferential groove, which is located at the end of the leash, wherein the ball can be inserted into a matching counterpart in the extension mechanism and a prestressed securing hook engages in the groove in the ball in order to hold it in position. If the hook is removed in the fully unrolled state of the leash when desired by the owner, the ball can be guided together with the leash through the corresponding recess in the housing and thus the leash can be disconnected from the retraction mechanism.

In a further advantageous embodiment of the invention, the leash is designed to be reflective. This increases visibility at night.

An embodiment in which the leash device has a lamp, in particular on the housing, is also advantageous. As a result, the dog owner can easily identify the path even at night, increasing safety.

In a further advantageous embodiment of the invention, the housing can be worn on the body of the dog owner via a clip or a chain.

BRIEF DESCRIPTION OF DRAWINGS

Embodiments of the present invention will be explained in more detail below with reference to the accompanying drawings.

DETAILED DESCRIPTION

Figure 1:
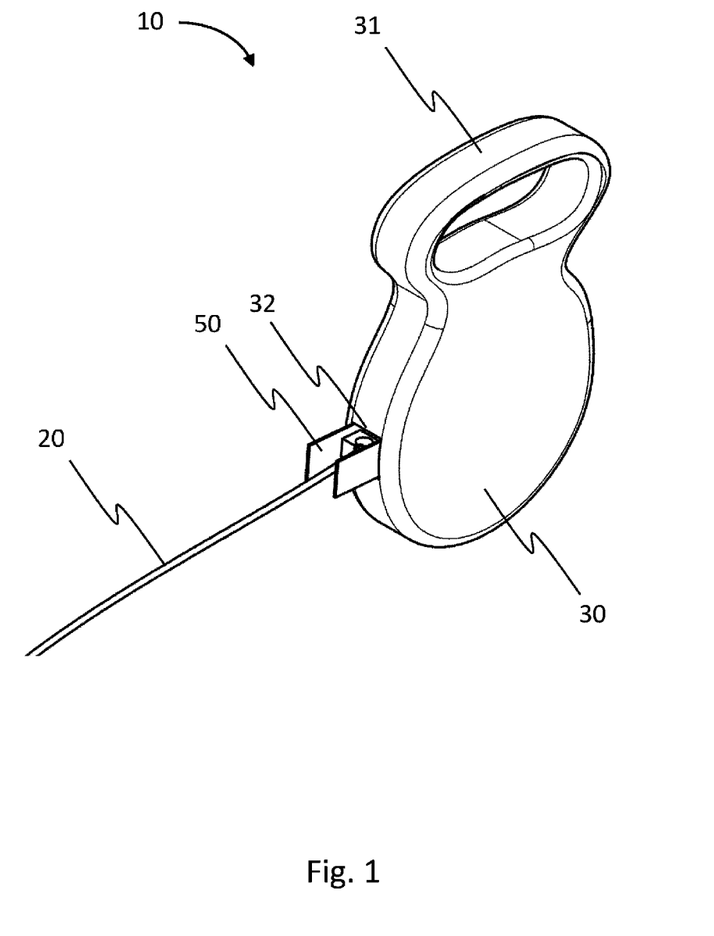
FIG. 1 is a perspective view of a first embodiment of the invention

FIG. 1 is a perspective view of a first embodiment of the leash device 10 according to the invention. The leash device 10 has a leash 20, which is guided out of a housing 30. The housing 30 has a handle 31, which is held in the hand of a dog handler (not shown). The shape of the housing 30 is not limited to the shape shown in FIG. 1, but said housing can assume other shapes. The leash 20 is connected to a dog (not shown). Within the housing 30, the leash device 10 has a retraction mechanism, which in turn has a coupling mechanism 50. In the embodiment shown, it projects from the housing 30 out of a housing opening 32 in the fully unwound state of the leash, as shown in FIG. 1. In this state, the leash 20 can be released from the coupling mechanism.

Figure 2:
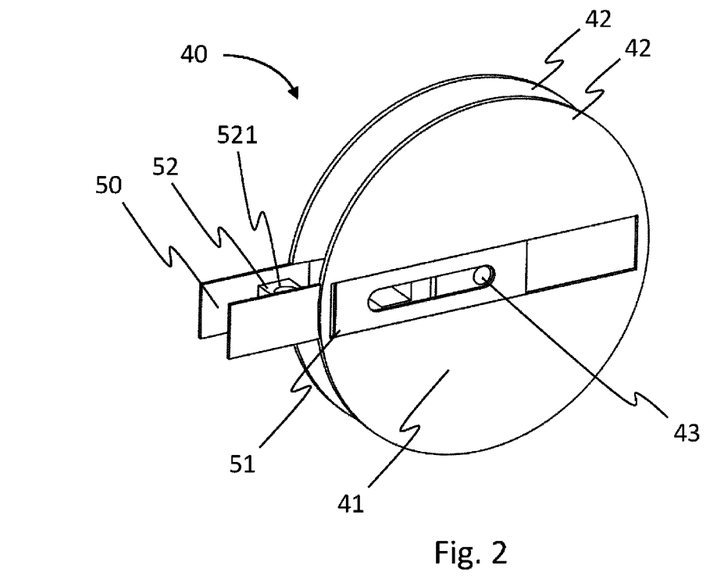
FIG. 2 is a detailed view of the coupling mechanism of the embodiment shown in FIG. 1

FIG. 2 shows the retraction mechanism 40 from the embodiment of the leash device 10 according to the invention shown in FIG. 1. The retraction mechanism 40 is provided in the form of a reel 41 on which the leash 20 can be wound. The reel 41 has a center point 43, two side walls 42 and a retraction surface 44 arranged between the side walls 42, which is not visible in the view shown in FIG. 2. Similarly to the side walls 42, the retraction surface 44 has a round cross section, wherein the radius of the retraction surface 44 is expediently smaller than that of the side walls 42. If the leash 20 is retracted on the retraction surface 44 by rotation of the reel 41 about its center point 43, the two side walls 42 of the leash 20 serve as a lateral boundary so as to ensure that the leash is retracted and unrolled without the leash 20 being knotted or jammed. The reel 41 thus has approximately the shape of a cable reel, as is found in the electrical sector, or a hose reel for a garden hose.

The rotational movement for retracting the leash 20 can thereby be generated, for example, by a torsion spring, which applies a torque to the reel 41 and is configured to always rotate the reel 41 in such a way that a force in turn acts on the leash 20, by means of which force said leash is retracted on the reel 41. Such or similar systems with the described mode of operation are already known from the retractable leashes described at the outset, which is why the underlying technology does not need to be discussed further at this point. In any case, it is advantageously also possible for the dog handler to lock the rotational movement of the reel 41 and thus prevent the leash 20 from being retracted or unrolled, if this should be desired.

In the embodiment of the retraction mechanism 40 shown in FIG. 2, said mechanism furthermore has a coupling mechanism 50 in the form of a coupling slider 51. The coupling slider 51 in turn has a coupling counterpart 52 having a coupling recess 521. For uncoupling the leash 20 from the retraction mechanism 40, the coupling slider 51 is displaced in a translational manner and a corresponding recess guided in the side walls 42. Due to the displacement, the coupling counterpart 52 is pushed out of the retraction surface 44 until the coupling recess 521 is exposed. The displacement can be carried out, for example, by a corresponding slider on the outside of the housing 30 or by another mechanism.

The coupling recess 521 has a specific shape that corresponds to a coupling element 21 arranged at the end of the leash 20. This shape can be, for example, a ball or a cube or another geometric shape. For uncoupling the leash 20 from the retraction mechanism 40, this coupling element 21 is removed from the coupling recess 521 so that there is no longer a connection between the leash 20 and the retraction mechanism 40. For coupling, i.e., connecting the leash 20 to the retraction mechanism 40, the coupling element 21 of the leash 20 is inserted into the coupling recess 521 again and the coupling slider 51 is pushed back again so that the coupling counterpart 52 is again recessed in the retraction surface 44 and the leash 20 can be retracted again by the rotational movement of the reel 41.

Furthermore, it is conceivable to additionally secure the coupling element 21 of the leash 20 in the coupling recess 521. This can be achieved, for example, via a magnet in the coupling recess 521, which attracts the coupling element 21 of the leash 20. It is also conceivable to provide a movable projection, for example in the form of a hook, in the recess, which projection engages in a groove provided for this purpose in the coupling element 21 and thus holds the coupling element in the coupling recess 521. The projection can also be moved in such a way that it no longer engages in the groove and thus releases the coupling element 21. This mechanism is to be understood as a detent mechanism, which locks or secures the coupling element 21 in the coupling recess 521.

The embodiment shown has the advantage that displacing the coupling slider 51 and thus disconnecting the leash 20 from the retraction mechanism 40 is only possible when the leash 20 is completely unrolled. It is therefore a type of self-securing system.

Figure 3:
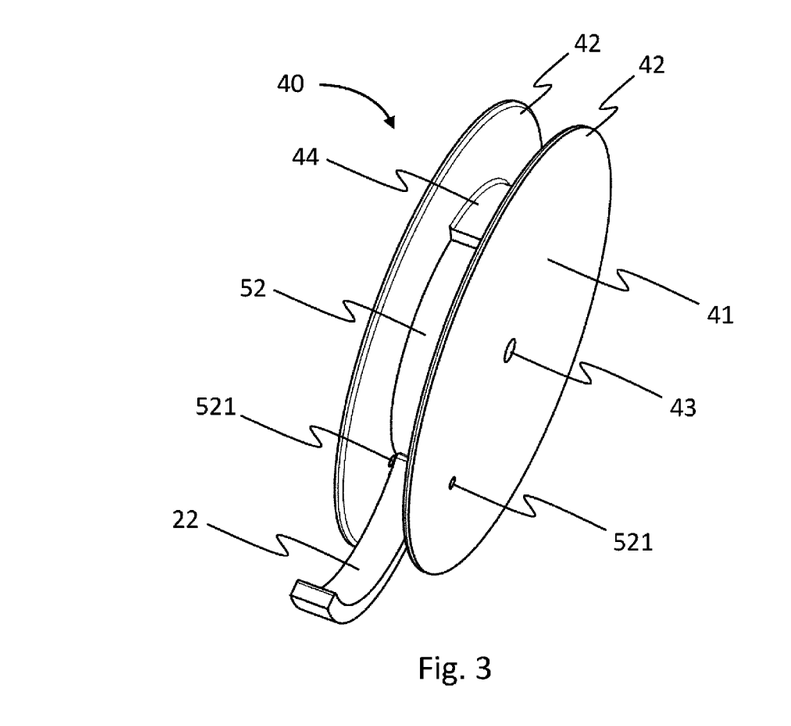
FIG. 3 shows a retraction and coupling mechanism in a further embodiment of the invention

FIG. 3 shows a further embodiment of a coupling mechanism 50 between the leash 20 and the retraction mechanism 40. This embodiment also has a reel 41 with two side walls 42 and a retraction surface 44 therebetween as a retraction mechanism 40. The statements made regarding the retraction mechanism 40 relating to the embodiment from FIG. 2, in particular with regard to the rotational movement of the reel 41 for retracting the leash 20, thus apply accordingly, and only the differences between the embodiments of the coupling mechanisms 50 from FIGS. 2 and 3 will be discussed below.

In contrast to the embodiment in FIG. 2, the embodiment in FIG. 3 does not have a coupling slider 51, but only a coupling counterpart 52 in the form of an indentation in the retraction surface 44. The coupling element 21 of the leash 20 is designed here as a type of circular segment-shaped bracket 22, which corresponds exactly to the indentation, i.e., the coupling counterpart 52, in the retraction surface 44. If the bracket 22 is inserted into the indentation, a round retraction surface 44 is produced on which the leash 20 can be retracted. The end of the bracket 22 is thereby fastened to the retraction mechanism 40 by positive-locking, which is by two protruding elements on the bracket, which each engage in two coupling recesses 521 in the side walls 42. If the protruding elements of the bracket 22 are pressed out of the coupling recesses 521, the bracket 22 is released from the retraction mechanism 40 and the leash 20 is uncoupled from the retraction mechanism 40.

Of course, other forms of the connection between the bracket 22 and the retraction mechanism are also conceivable. For example, other positive-locking options are possible or else the use of magnets or the like.

The leash 20 itself is not shown in FIG. 2, but is fixedly connected to the free end of the bracket 22, i.e., to the end at which the bracket 22 is not fastened to the side walls 42.

Figure 4:
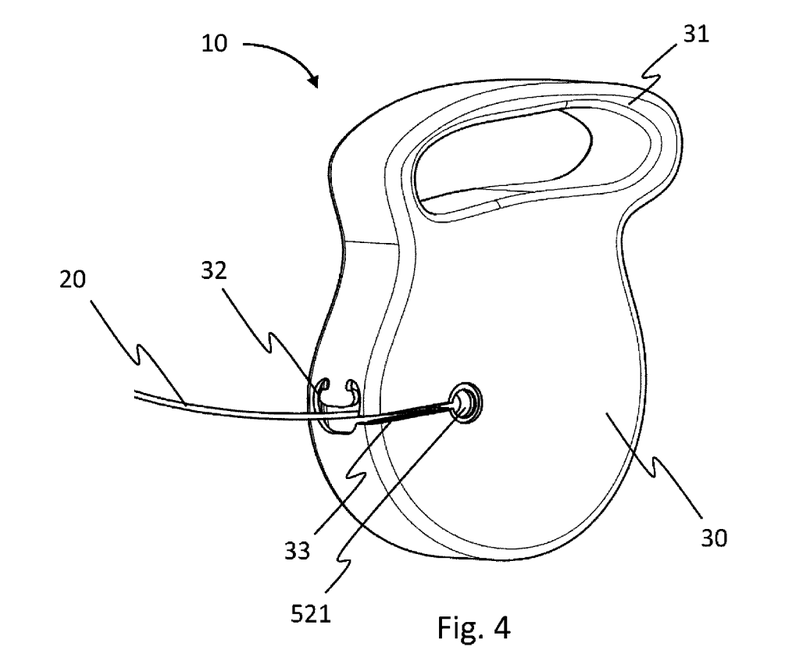
FIG. 4 shows a third embodiment of the invention

FIG. 4 shows the leash device 10 according to the invention in a third embodiment. Similarly to the embodiment shown in FIG. 1, the embodiment from FIG. 4 also has a housing 30 having a handle 31 and a housing opening 32, out of which a leash 20 is guided. Likewise, the leash 20 is also retracted in this embodiment in the interior of the housing 30 using a retraction mechanism (not shown). In addition, a first coupling opening 33 in the housing 30 can be seen in FIG. 4. The principle of the coupling mechanism in this embodiment shall be discussed in more detail below, in particular with reference to FIG. 5.

Figure 5:
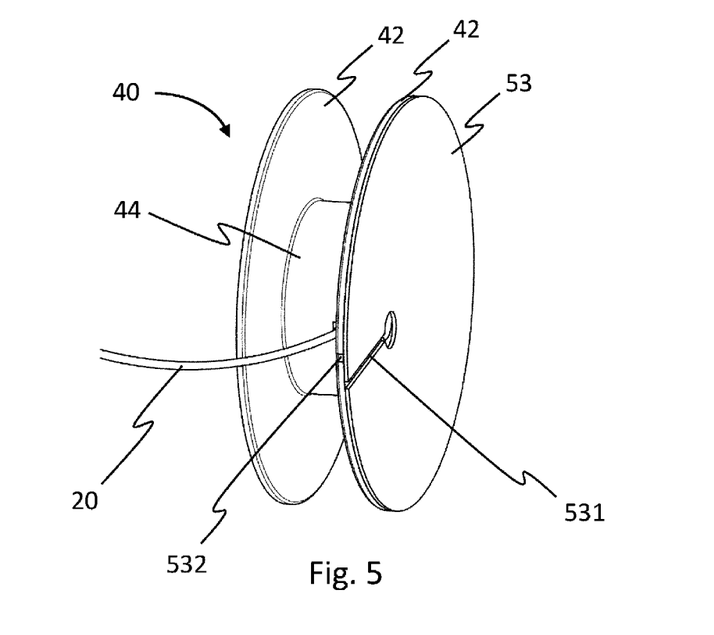
FIG. 5 is a detailed view of the retraction and coupling mechanism of the embodiment of the invention

FIG. 5 shows the basic retraction mechanism 40, already known from FIGS. 2 and 3, in the form of the reel 41 having the two side walls 42 and the retraction surface 44. However, in this embodiment, the coupling mechanism 50 is designed differently. It has a securing disk 53, which rests against one of the two side walls 42. In the embodiment shown, the securing disk 53 is in principle the same shape as the side walls 42 of the retraction mechanism 40.

A coupling recess 521 (see FIG. 4) is provided in the retraction mechanism 40, which coupling recess is designed to correspond to a coupling element 21 at the end of the leash 20. The coupling element 21 of the leash 20 can be inserted into this coupling recess 521. In order that the leash 20 itself can also be recessed in the retraction mechanism 40 and does not protrude, a corresponding groove is provided in the side wall 42 and the contact surface. In addition, a corresponding recess in the form of a second coupling opening 531 is provided in the securing disk 53, through which the leash 20 with the coupling element 21 must likewise be guided. In addition, the securing disk 53 has a rib 532, which is located on the side facing the side wall 42 and is offset from the second coupling opening 531.

The securing disk 53 is rotatably mounted on the side wall 42 so that the second coupling opening 531 can be moved into a position in which it is exactly congruent with the recess in the side wall 42 and the first coupling opening 33 of the housing 30, through which the leash 20 must be guided for uncoupling. In this position (removal position), the leash 20 with the coupling piece at the end can thus be removed from the coupling recess and can be guided out of the housing. This position is shown in FIG. 4.

However, if the securing disk 53 is in a position in which it is rotated relative* to the side wall 42, the second coupling opening 531 of the securing disk 53 is not in alignment with the corresponding recesses in the side wall 42 and the housing 30 (see FIG. 4). In this position of the securing disk 53, the leash 20 can thus not be uncoupled from the retraction mechanism 40 and is secured against removal. In this position, the leash 20 can be retracted safely by the retraction mechanism 40.

In the embodiment shown in FIG. 5, in this secured position the rib 532 is located in the recess in the side wall 42, whereby the position is clearly defined. The rotational movement of the securing disk 53 from the secured position into the removal position is performed by the dog owner themselves. For example, a lockable torsion spring, a slider to be actuated on the housing, or the like can be used for the rotation of the securing disk 53.

In all of the embodiments described, the retraction function of the retraction mechanism 40 is locked when the leash is completely unrolled and is only resumed again by manual actuation, which can also be associated with the coupling of the leash. In this way, it is possible to ensure that as soon as the leash 20 is removed, the retraction mechanism 40 in the form of the reel 41 remains in the position which makes it possible to couple the leash 20 again. In the embodiment shown in FIG. 2, the locking function of the retraction mechanism 40 can be coupled, for example, to the movement of a detent mechanism (see above) in the form of a movable projection in the coupling recess 521, which engages in a groove or the like in the coupling element 21 of the leash 20. In the embodiment shown in FIGS. 4 and 5, the locking function can be coupled to the rotational movement of the securing disk 53, for example.

FIG. 6a to 6d show a sectional view of a further embodiment according to the invention of the leash device for a dog, wherein the function of the coupling mechanism 50 in this embodiment shall be explained in more detail below with reference to FIG. 6a to 6d.

The embodiment shown has a housing 30 having a handle 31 and a retraction mechanism 40 in the form of a reel 41. The reel 41 has a coupling mechanism 50 having a coupling slider 51, which is horizontally displaceable in the drawing plane of FIG. 6a to 6c in a translational manner and is connected to a leash 20 by a coupling element 21 and a coupling counterpart 52 (see FIG. 6d). The leash 20 can thereby be wound and unwound on the reel 41. The reel 41 is pretensioned by a spring (not shown) in such a way that the leash 20 is wound onto the reel 41 when there is no load. By selecting a suitable spring strength, it is possible to determine how strongly the leash 20 has to be pulled so that it is unwound from the reel 41.

Figure 6A:
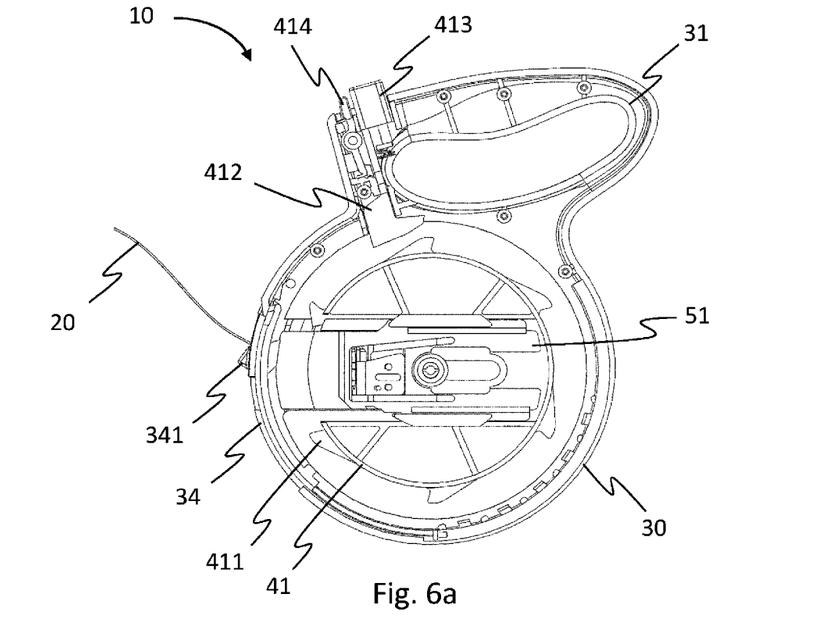
FIG. 6a shows a further embodiment of the leash device 10 according to the invention in a sectional view and a first configuration

A plurality of reel latches 411 are arranged in the circumferential direction of the reel 41. Furthermore, a rotation lock 412, which can be actuated via a lock actuating element 413, are arranged in the vicinity of the handle 31. If the dog owner wants to prevent unwinding or winding of the leash 20 on or from the reel 41, they actuate the lock actuating element 413, whereby the rotation lock 412 is moved in the direction of the reel 41 and the rotation lock 412 is pressed against the reel latches 411 and thus a rotational movement of the reel 41 is inhibited. The rotation lock 412 is preferably actuated against a spring so that the rotation lock 412 does not hinder the rotation of the reel 41 when it is not actuated. In order to ensure that the rotational movement of the reel 41 is locked without having to continuously actuate/press the lock actuating element 413, a locking detent 414 is provided, which engages in the mechanism of the rotation lock 412 and can lock in the locking position, i.e., in engagement with the reel latches 411.

Furthermore, the embodiment shown has a housing door 34, which can be opened against a spring by a housing actuating element 341 and is thus held in the closed state by the spring when it is not actuated. The housing door 34 is configured such that, when the housing door 34 is open, the coupling slider 51 can be moved in a translational manner out of the housing 30 via the housing door 34, as is shown in more detail in the configurations of FIGS. 6b and 6c.

In the configuration shown in FIG. 6a, the leash 20 can be unwound freely, but is not yet in the completely unwound state. A dog which is connected to the leash device 10 by the leash 20 can thus freely move away from or closer to the dog owner holding the leash device 10 by the handle 31, wherein the length of the leash 20 adapts to the distance of the dog.

Figure 6B:
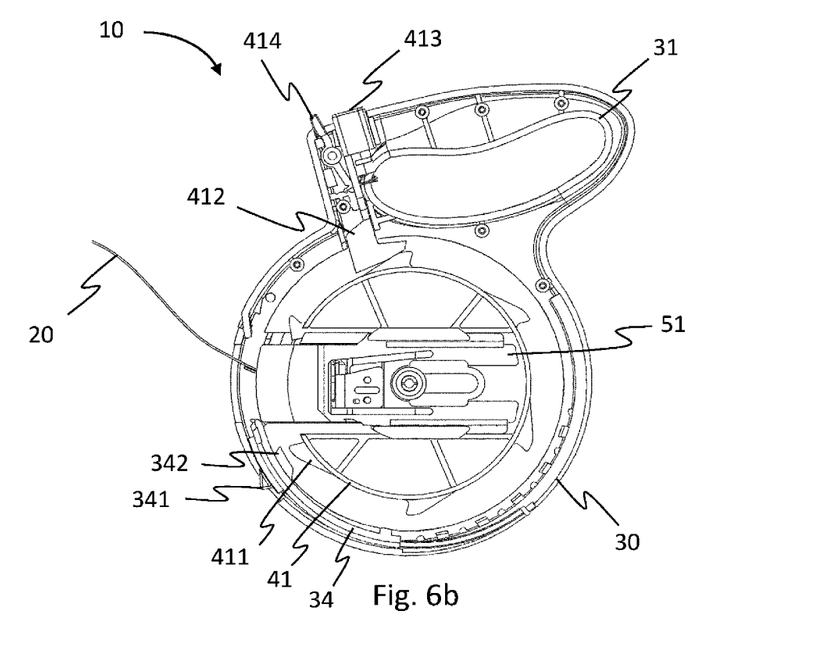
FIG. 6b shows a second configuration of the embodiment according to the invention from FIG. 6a FIG. 6c shows a third configuration of the embodiment according to the invention from FIG. 6a, and FIG. 6d is a perspective view of the third configuration of the embodiment according to the invention from FIG. 6c.

In the configuration shown in FIG. 6b, the leash 20 is completely unwound from the reel 41 and the dog owner wishes to disconnect the leash 20 from the reel 41. For this purpose, as shown, the lock actuating element 413 is actuated by the dog owner so that the rotation lock 412 presses against one of the reel latches 411 and forms a positive lock, whereby a rotational movement of the reel 41 is prevented. In order to lock the locking effect, the locking detent is also actuated.

In addition, the dog owner slides open the housing door 34 against the spring using the housing door actuating element 341 until a latching element 342 on the housing door 34 latches in a recess provided for this purpose in the housing 30 (recess not shown) and fixes the housing door 34 in this open position.

Figure 6C:
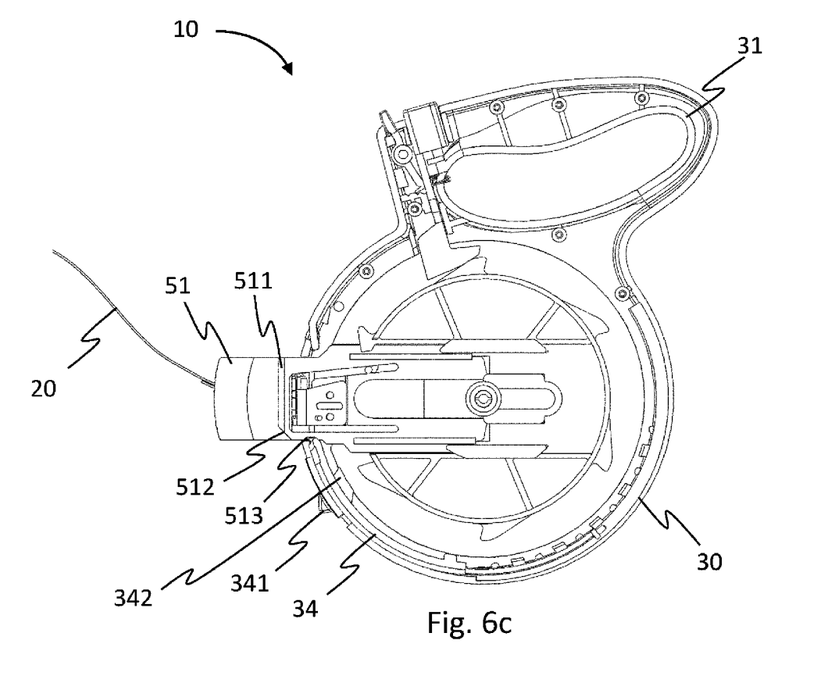

If the leash device 10 is in the configuration shown in FIG. 6b, the translational movement of the coupling slider 51 can take place so that the coupling slider 51 projects at least partially out of the housing 30. This configuration is shown in FIG. 6c. The coupling slider 51 furthermore has a taper 511 and a bevel 512 and a latching recess 513. The taper thereby reduces the width of the front part of the coupling slider 51, i.e., of the part in which the coupling counterpart 52 is located.

During the translational movement of the coupling slider 51 out of the housing 30, the upper part of the housing door 34 in the drawing plane abuts against the taper 511 or the bevel 512. As a result, the housing door 34 is displaced downward to a certain degree in the plane of the drawing so that the latching element 342 of the housing door 34 is pressed out of the recess in the housing 30. The housing door 34 is thereby pressed from below against the coupling slider 51 by the corresponding spring and can thus not close. Due to the further movement of the coupling slider 51, in the end position of the coupling slider 51, the housing door 34 latches into the latching recess 513 provided for this purpose in the coupling slider 51. Due to the latching, movement of the coupling slider 51 is only possible again when the housing door 34 is pushed downward by the housing door actuating element 341 and thus releases the movement of the coupling slider 51. In this way, secure positioning of the coupling slider 51 during the coupling process can be ensured.

Figure 6D:
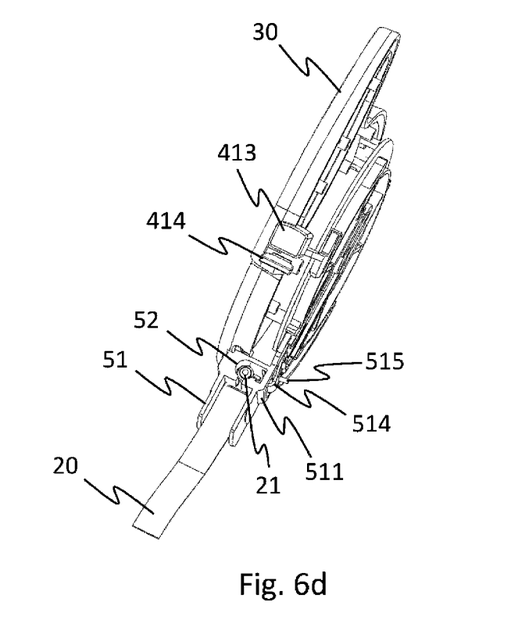

FIG. 6d shows the embodiment in the same configuration as FIG. 6c, but in a perspective view, wherein one half of the housing 30 is not shown. FIG. 6d discloses the coupling element 21 on the leash 20 and the coupling counterpart 52, into which the coupling element 21 can be inserted and removed for connection to or removal from the reel 41.

Furthermore, the coupling slider 51 has a translation lock 514 having a pin 515. The translation lock 514 is designed in the form of a leaf spring, which is preloaded in such a way that it experiences a force directed away from the coupling element 21. If the coupling element 21 is not inserted in the coupling counterpart 51, the translation lock 514 moves away from the coupling counterpart 52. As a result, the pin 515 engages in a recess provided for this purpose in the housing 30, whereby the translational movement of the coupling slider 51 is prevented when the coupling element 21 is not inserted in the coupling counterpart 52.

In order to implement this linkage between the coupling element 21 and the translation lock 514, in the embodiment shown, part of the translation lock 514 projects into the coupling counterpart 52, wherein this part has a chamfer. When the coupling element 21 is inserted into the coupling counterpart 52, the coupling element 21 is thus guided along the chamfer and the translation lock 514 is thus pulled to the coupling counterpart 52 and the coupling element 21. If the coupling element 21 is removed, the translation lock 514 moves away from the coupling counterpart 52 again due to its form as a prestressed leaf spring and the locking effect sets in.

In order to restore the connection between the leash 20 and the reel 41, the coupling element 21 is again inserted into the coupling counter element 52. As a result, the translation lock 514 is released as described. Furthermore, the housing door 34 is briefly actuated in a downward motion by the housing door actuating element 341, as a result of which the housing door 34 is pushed out of the latching recess 513 and the coupling slider 51 can be pushed into the housing 34 again in a translational manner until it is in the starting position (see FIG. 6b). Subsequently, the housing door 34 is closed by the spring force and the rotation lock 412 is released by actuating the locking detent 414 and the lock actuating element 413. The leash device 10 can then be used as a retractable leash again.

LIST OF REFERENCE SIGNS

10 Leash device
20 Leash
21 Coupling element
22 Bracket
30 Housing
31 Handle
32 Housing opening
33 First coupling opening (on the housing)
34 Housing door
341 Housing door actuating element
342 Latching element
40 Retraction mechanism
41 Reel
411 Reel latch
412 Rotation lock
413 Lock actuating element
414 Locking detent
42 Side wall
421 Second coupling opening (side wall)
43 Center point
44 Retraction surface
50 Coupling mechanism
51 Coupling slider
511 Taper
512 Bevel
513 Latching recess
514 Translation lock
515 Pin
52 Coupling counterpart
521 Coupling recess
53 Securing disk
531 Second coupling opening (securing disk)
532 Rib (securing disk)

The invention claimed is:

1. A leash device for animals, comprising:
a housing which is designed to be held by a person;
a retraction mechanism which is arranged inside the housing; and,
a leash which is designed to be connected by one end to an animal and by the other end, via a coupling mechanism, to the retraction mechanism of the leash device, wherein the retraction mechanism is designed to retract the leash into the housing from an at least partially extended state, and wherein the coupling mechanism is designed to uncouple the leash from the retraction mechanism when the leash is completely extended, and wherein the coupling mechanism is arranged translationally moveably within the retraction mechanism.

2. The leash device according to claim 1, wherein the retraction mechanism applies a continuous force to the leash, which force is designed to retract the leash in the housing and is caused in particular by an elastic element, and/or wherein the retraction mechanism is designed in such a way that it is locked in a state in which the leash is uncoupled from the retraction mechanism and is active in a state in which the leash is connected to the retraction mechanism.

3. The leash device according to claim 1, wherein the coupling mechanism is formed by a coupling element on the leash and a coupling counterpart on the retraction mechanism.

4. The leash device according to claim 3, wherein the coupling mechanism is provided by a positive-locking connection.

5. The leash device according to claim 1, wherein the leash is designed in the form of a rope at the end at which it is connected to the animal.

6. The leash device 4 according to claim 1, wherein the retraction mechanism has a reel, which is designed to retract the leash thereon.

7. The leash device according to claim 6, wherein the coupling mechanism has an elastic element which is designed to hold the coupling mechanism in a defined position in the retraction mechanism.

8. The leash device according to claim 6, wherein the coupling mechanism is designed to be foldable in the form of a bracket on the circumference of the reel in such a way that the bracket is recessed in the circumference of the reel in the folded-in state.

9. The leash device according to claim 1, wherein the housing has a first coupling opening, which is designed such that the end of the leash, which is connected to the retraction mechanism, can be guided through the first coupling opening.

* * * * *

UNITED STATES PATENT AND TRADEMARK OFFICE
CERTIFICATE OF CORRECTION

PATENT NO. : 12,369,567 B2  
APPLICATION NO. : 18/684063  
DATED : July 29, 2025  
INVENTOR(S) : Claudia Nögel Page 1 of 1

It is certified that error appears in the above-identified patent and that said Letters Patent is hereby corrected as shown below:

In the Claims

Column 12, Line 37 should read:
"The leash device according to claim 1, wherein the"

Signed and Sealed this  
Twenty-first Day of October, 2025

John A. Squires  
*Director of the United States Patent and Trademark Office*